United States Patent

Klein et al.

[11] Patent Number: 5,847,286
[45] Date of Patent: Dec. 8, 1998

[54] MAGNETICALLY INDUCTIVE FLOW METER FOR FLOWING MEDIA

[75] Inventors: Jürgen Winfried Klein, Hattingen; Peter Dullenkopf, Bochum; Arnd ten Have, Oberrhausen; Andreas Lenniger, Anröchte; Andreas Stratmann, Essen, all of Germany

[73] Assignee: Krohne Messtechnik GmbH & Co. KG, Germany

[21] Appl. No.: 652,520

[22] PCT Filed: Oct. 5, 1995

[86] PCT No.: PCT/EP95/03925

§ 371 Date: Apr. 4, 1997

§ 102(e) Date: Apr. 4, 1997

[87] PCT Pub. No.: WO96/11384

PCT Pub. Date: Apr. 18, 1996

[30] Foreign Application Priority Data

Oct. 7, 1994 [DE] Germany ............... 44 35 966.7
Dec. 20, 1994 [DE] Germany ............... 44 45 591.7

[51] Int. Cl.[6] .................................................. G01F 1/58
[52] U.S. Cl. ............................................... 73/861.11
[58] Field of Search ........................... 73/861.11, 861.12, 73/861.08

[56] References Cited

U.S. PATENT DOCUMENTS

| | | | |
|---|---|---|---|
| 4,434,666 | 3/1984 | Hemp et al. | 73/861.12 |
| 4,539,853 | 9/1985 | Appel et al. | 73/861.12 |
| 4,631,969 | 12/1986 | Scmoock | 73/861.12 |
| 4,658,652 | 4/1987 | Picone et al. | 73/861.12 |
| 5,337,607 | 8/1994 | Brown | 73/861.12 |
| 5,400,659 | 3/1995 | Yokoi et al. | 73/861.08 X |
| 5,544,532 | 8/1996 | Brown | 73/861.12 X |

FOREIGN PATENT DOCUMENTS

| | | |
|---|---|---|
| 1548918 | 9/1966 | Germany . |
| 58196419 | 11/1983 | Japan . |
| 299829 | 4/1990 | Japan . |
| WO8302000 | 6/1983 | WIPO . |

*Primary Examiner*—William L. Oen
*Attorney, Agent, or Firm*—Gesari and McKenna, LLP

[57] ABSTRACT

The invention concerns a magnetically inductive flow meter for flowing media with a tube consisting of ceramic material and used as a measurement line, a magnet to produce a magnetic field running at least essentially perpendicular to the tube axis, at least two measuring electrodes arranged preferably perpendicular to the tube axis and preferably perpendicular to the direction of the magnetic field and at least two screening or shielding electrodes shielding the measuring electrodes from outer electrical fields, wherein the measuring electrodes and the screening or shielding electrodes are placed outside the tube. The shielded magnetically inductive flow meter is characterized in that there is a layer consisting of a ceramic material surrounding the tube, that the measuring electrodes are arranged essentially inside the layer and especially on the border between the layer and the tube, and that the screening or shielding electrodes inside the layer, especially on the border between the layer and the tube and especially on the outer surface of the layer are arranged so that the screening or shielding electrodes shield the measuring electrodes from the outside.

10 Claims, 3 Drawing Sheets

MAGNETICALLY INDUCTIVE FLOW METER FOR FLOWING MEDIA

BACKGROUND OF THE INVENTION

1. Field of the Invention

The invention concerns a magnetically inductive flow meter for flowing media with: a tube that is made of a ceramic material and used as a measuring line; a magnet for producing a magnetic field that runs at least essentially perpendicular to the axis of the tube, with at least two measurement electrodes arranged preferably perpendicular to the tube axis and preferably perpendicular to the direction of the magnetic field; and at least two shielding or screening electrodes that shield the measurement electrodes from outside electrical fields, wherein the measurement electrodes and the shielding or screening electrodes are placed outside the tube.

2. Description of The Related Art

The flow meter previously described is known from DE-A-33 37 151, from which this invention comes. In that flow meter, the measurement electrodes and the screening or shielding electrodes are placed galvanically on the surface of the ceramic tube. Because of this placement, the measurement electrode can only be shielded from the side. Now in order to make screening or shielding possible radially to the outside, DE-A-33 37 151 proposed attaching a ceramic supporting body in the area of the measurement electrode from the outside. This ceramic supporting body has screening or shielding electrodes on the surfaces that form the outer surface of the whole arrangement after the supporting body is placed on the tube and are also applied galvanically. In order to produce a tight connection between the ceramic supporting body and the tube with the measurement electrodes and the screening or shielding electrodes, the screening or shielding electrode placed on the ceramic supporting body is soldered to the screening or shielding electrode placed on the tube. The electrical signal that is produced by the measurement electrode is taken to the outside by a contact pin that runs through a hole in the ceramic supporting body. Provision is also made for the components of the preamplifier to connect directly to the screening or shielding electrodes arranged on the ceramic supporting body and the contact pin, which are, in turn, shielded by a screening or shielding box or cup attached to the supporting body from the outside.

The flow meter known from DE-A-33 37 151, now has various disadvantages. For one thing, it takes a large number of operational steps to produce the screening or shielding for the measurement electrodes. For this, the measurement electrodes and screening or shielding electrodes are first applied galvanically to the tube.

The ceramic supporting bodies are produced in a separate operation, and the screening or shielding electrodes are then placed on them by galvanization. Finally, the ceramic supporting body must be attached to the tube by soldering the screening or shielding electrodes on the tube on the outer edge of the contact surface to the screening or shielding electrodes on the supporting body. So it takes many operational steps to produce this arrangement of measurement and screening or shielding electrodes.

Another disadvantage of the known flow meter is that flaws can occur in the shielding of the measurement electrode, if the solder points are damaged by shaking, for example, and so holes can occur in the shielding. Another disadvantage of this flow meter is that having the ceramic supporting body and the screening or shielding box or cup attached to it makes the whole flow meter very high, and it cannot be designed compactly.

Another magnetically inductive flow meter known from DE-A-43 03 402 measures the flow speed of dielectric or electrically conductive media with a contactless capacitive pick-up. Since both the measurement electrodes and the screening or shielding electrodes are arranged on the outer surface of the tube, the screening or shielding electrodes can, because of this arrangement, only shield the measurement electrodes laterally, so that other measures are necessary to shield them radially to the outside. For this, DE-A-43 03 402 specifies that shielding covers insulated from the measurement electrodes and connected conductively to the screening or shielding electrodes be arranged on the tube from the outside. These box-shaped shielding covers are soldered onto the screening or shielding electrodes. To further process the voltage signals produced by the measurement electrodes, signal lines are soldered onto the measurement electrodes, and these signal lines lead to the outside for further processing of the electrical signals.

The magnetically inductive flow meter known from DE-A-43 03 402 has various disadvantages. For one thing, it is only possible to place metal electrodes and shieldings on the ceramic tube in one layer, directly on the surface of the measuring tube. Because of this, it is not possible with the flow meter already described and known from the state of the art, to shield the measuring electrodes from the outside with shieldings placed on the ceramic tube. Therefore, an expensive box-shaped shielding cover is necessary that must be soldered to the screening or shielding electrodes. This is a disadvantage because in producing the flow meter, a separate processing operation is necessary to produce such a shielding or screening. Moreover, soldering the screening or shielding cover to the screening or shielding electrode is expensive, on the one hand, and accident-prone, on the other, since the solder points are damaged by vibration, so that cracks or even fractures occur and the shielding can be defective.

The journal "Markt & Technik-Wochenzeitung fur Elektronik"[Market and Technology Weekly for Electronics], Issue 23 of Jun. 3, 1994, page 36 describes the use of flexible ceramic films or foils sintered at low temperature in thick-film or layer technology to make complex multi-layer circuits. In this known LTCC (Low Temperature Cofired Ceramic) technology, unfired LTCC films or foils are mechanically structured, printed in thick-film or layer technology, laminated and then sintered at high temperature, which then produces a multilayer ceramic.

SUMMARY OF THE INVENTION

The purpose of this invention is to design and develop the magnetically inductive flow meter for flowing media known from the state of the art in such a way that the measurement electrodes and the screening or shielding electrodes can be placed outside the tube more easily with respect to production and reliably.

The invention does this by having a layer of ceramic material surrounding the tube, arranging the measuring electrodes essentially inside the layer and arranging the screening or shielding electrodes both inside the layer and on the outer surface of the layer so that the measuring electrodes are shielded from the outside. In such a layer it is also possible to arrange the surfaces of the measuring electrodes and the screening or shielding electrodes at different distances from the surface of the tube, so that the measuring electrodes can be shielded both radially to the outside and also peripherally to the side.

Because such extensive shielding is possible by putting or having the layer with the measuring electrodes and screening or shielding electrodes built or integrated, there are various advantages. For one thing, the whole measuring electrode and screening or shielding electrode arrangement can be produced in one operational step, so that the soldering of extra screening electrodes known from the state of the art is avoided. For another thing, the layer surrounding the tube is not very thick, so that the size of the flow meter is increased only slightly by that layer.

In one especially preferred embodiment of this invention, the flexible LTCC ceramic film or foil sinterable at high temperature described above are now used to build the layer surrounding the tube. Thus, the advantages of using this LTCC ceramic film or foils are carried over in a special way to building magnetically inductive flow meters. Before being placed on the tube, the unfired LTCC ceramic films or foils are provided with a conductive layer in an appropriate way, so that the arrangement of measuring electrodes and screening or shielding electrodes described above is produced if, for example, two of these LTCC ceramic films or foils are placed on the tube one over the other. It is also an advantage that the measuring electrodes and screening or shielding electrodes formed in this way are arranged between the LTCC ceramic films or foils, hence on their border as well as on the outer surface of the outside LTCC ceramic film or foil. Then, in the subsequent sintering operation, a multilayer ceramic forming the layer surrounding the tube is created into which the arrangement of measuring and screening electrodes is built or integrated. By using LTCC technology to produce the magnetically inductive flow meters according to the invention, it is thus possible in a very advantageous way, to simplify the production process greatly and at the same time position the measuring and screening or shielding electrodes very precisely.

In another advantageous embodiment of this invention, the lines and resistor tracks necessary for the preamplifiers for each measuring electrode in the layer are produced using LTCC technology. This allows extremely short tracks, and the electrical signals produced by the measuring electrodes can be reliably preprocessed, so to speak, on site. The components necessary for making the preamplifier can thus be installed directly on the layer, hence, so to speak, directly on the tube used as a measuring line. Thus, the cover of the tube itself becomes a support for electronic components. Now if the conductive connection between each measuring electrode and its assigned preamplifier is produced using LTCC technology, all of the advantages already indicated for the whole system, consisting of measuring and screening or shielding electrodes and preamplifiers, are exploited.

Another advantage of the design of the flow meter according to the invention lies in the fact that the disturbing microphonical effects known from using thick-film or foil technology are excluded. Disturbances from microphonical effects are caused by split or crack formation, i.e., very fine hollow spaces between electrode surface and dielectrics and/or slight relative movements of the electrode connections against the magnetic and/or electrical field of the exciter layout of the flow meter, which make it practically impossible to measure the volume flow on the basis of the small size of the measurement signal. On the other hand, as described above, if LTCC technology is used, solid ceramic structures are produced by the sintering operation, which make the split or crack build-up leading to microphonical effects and relative movements of the electrode connections impossible.

Finally, it should also be pointed out that the magnetically inductive flow meter already described is very reliable up to very high temperatures and that if the line and resistor tracks for making the preamplifiers are produced by LTCC technology, there is good temperature coupling between the two preamplifiers, which improves the temperature synchronization advantageously.

BRIEF DESCRIPTION OF THE DRAWINGS

This invention will be explained in greater detail below using an exemplary embodiment and referring to the drawings wherein.

DESCRIPTION OF THE PREFERRED EMBODIMENTS

Figure 1:
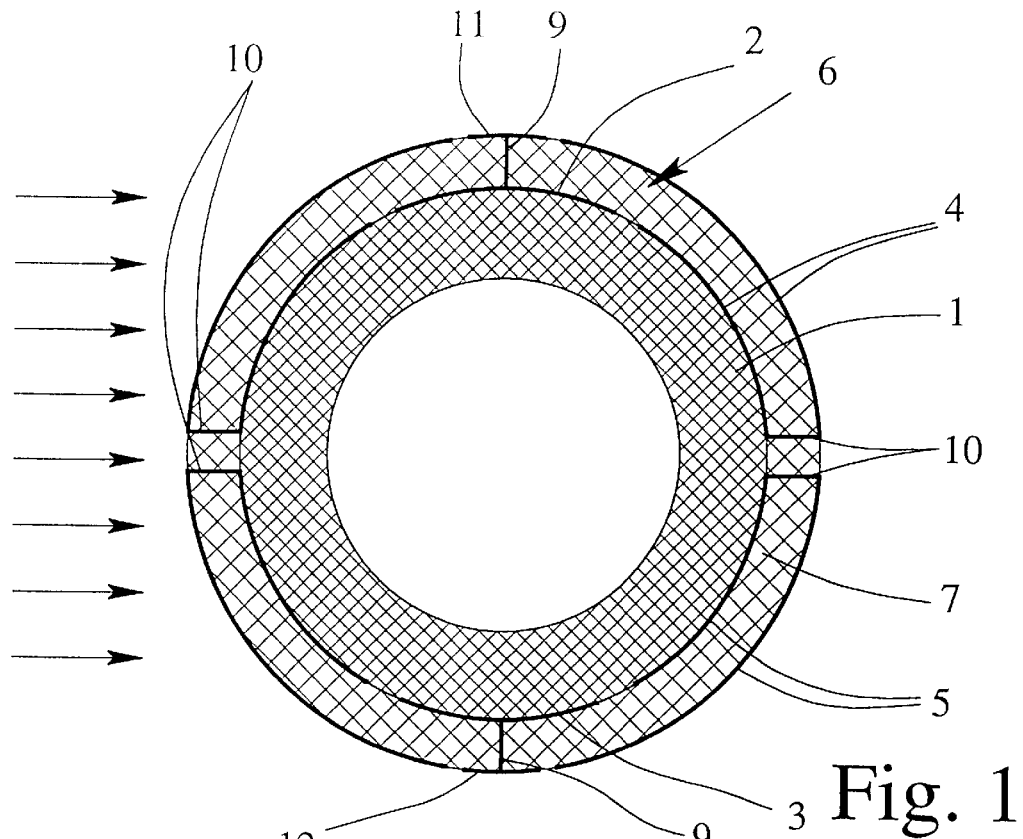
FIG. 1 shows a cross-section through the tube of a first embodiment of a flow meter according to the invention.

FIG. 1 shows a cross-section of the tube 1 made of ceramic material and used as a measuring line. The use of ceramic as a material for the tube 1 is advantageous if the liquids or media are aggressive, for example, highly corrosive or at high temperatures. A magnetic field running essentially perpendicular to the tube axis is produced by a magnet, not shown in the drawing; FIG. 1 shows the magnetic field schematically with arrows. Because of this magnetic field and the speed of the charged particles present in the medium, the medium is deflected from its track perpendicular to the tube axis and perpendicular to the direction of the magnetic field due to the Lorenz force. In this way, particles with different charges are separated from one another, so that a charge polarization and hence an electrical field is formed in the flowing medium.

This electrical field can be measured by measuring electrodes 2 and 3 arranged preferably near the flowing medium perpendicular to the tube axis and preferably perpendicular to the direction of the magnetic field. In the magnetically inductive flow meter according to the invention, the measuring electrodes 2 and 3 are not in direct contact with the flowing medium, but are arranged outside the tube.

The voltage values measured at the measuring electrodes 2 and 3 have only a low amplitude, so that it is necessary to shield the measuring electrodes 2 and 3 well from outside electrical fields. For this, at least two screening or shielding electrodes 4 and 5 that shield the measuring electrodes 2 and 3 are provided and arranged outside the tube 1.

According to the invention, a layer 6 made of a ceramic material is now provided that surrounds the tube 1. In this layer 6, the measuring electrodes 2 and 3 are essentially arranged in the inside of, that means in, the layer 6. But it is also possible to arrange the measuring electrodes 2 and 3 on the inner surface of the layer 6 so that they are on the border between the tube 1 and the layer 6. Moreover, the screening or shielding electrodes 4 and 5 are also arranged in the layer 6, whereby the screening electrodes 4 and 5 are both arranged partially inside the layer 6 and also on the border between the layer 6 and the tube 1 or on the outer surface of the layer 6. This arrangement of the measuring electrodes 2 and 3 and the screening or shielding electrodes 4 and 5 shields the measuring electrodes 2, 3 almost completely from the outside.

In another preferred way, the layer 6 is made of at least one flexible LTCC ceramic film or foil 7, 8 sinterable at low temperature. In this way, the advantages associated with using this ceramic film or foil already mentioned are carried over to the production of flow meters.

In the first embodiment the layer 6 is mater according to the invention shown in FIG. 1, the layer 6 is made essentially from LTCC ceramic film or foil 7. The LTCC ceramic film or foil 7 has flat metal coatings, which are arranged so that after the LTCC ceramic film or foil 7 is placed on the tube 1, these metal surfaces form the measuring electrodes 2 and 3 as well as the screening or shielding electrodes 4 and 5. On one hand, parts of the measuring electrodes 2 and 3 and parts of the screening or shielding electrodes 4 and 5 are arranged, on one hand, between the tube 1 and the LTCC ceramic film or foil 7, hence on their border, and, on the other hand, on the outside of the LTCC ceramic film or foil 7. Now in order to produce a conductive connection from the inner parts of the measuring electrodes 2 and 3 and the screening or shielding electrodes 4 and 5 with parts of the measuring electrodes 2 and 3 and screening or shielding electrodes 4 and 5 arranged on the outer surface of the LTCC ceramic film or foil 7, the LTCC ceramic film or foil 7 has throughplating or contacts 9 at appropriate places for the measuring electrodes 2 and 3, and throughplatings or contacts 10 for the screening or shielding electrodes 4 and 5.

Figure 2:
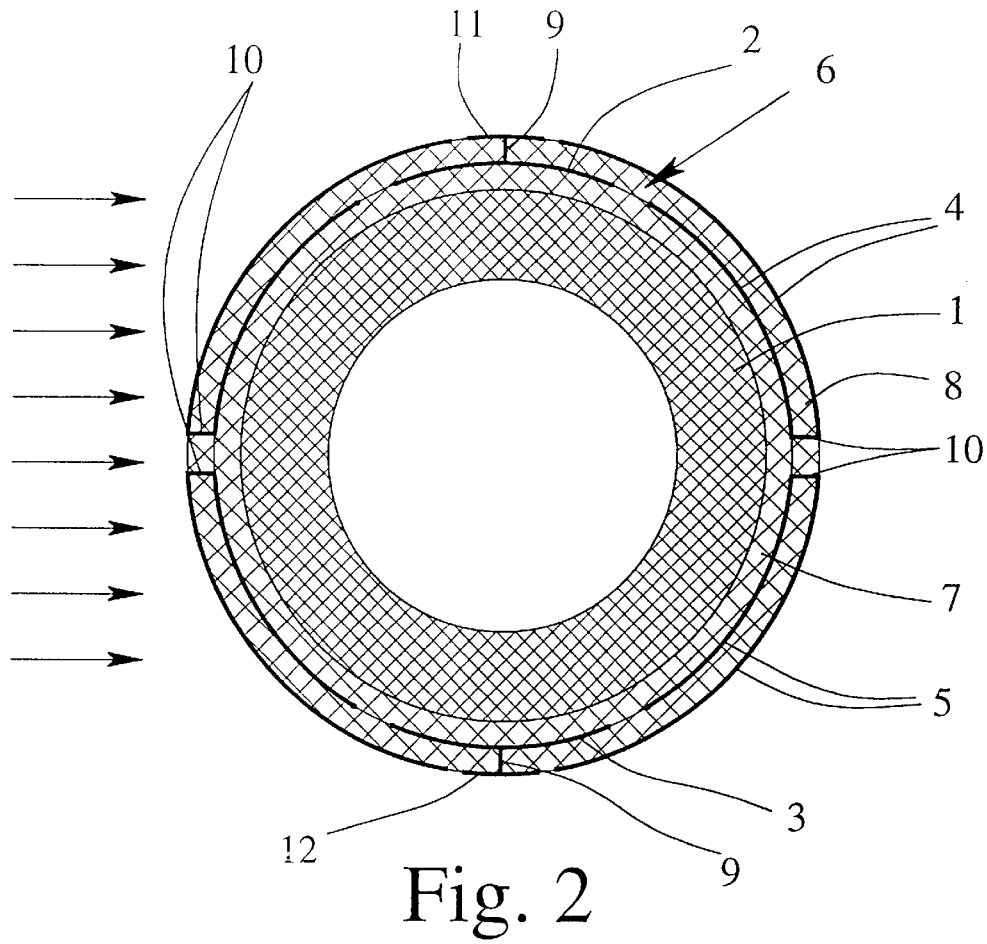
FIG. 2 shows a cross-section through the tube of a second embodiment of the flow meter of the invention.

In the second embodiment shown in FIG. 2, the layer 6 is composed of two LTCC ceramic films or foils 7 and 8. The LTCC ceramic films or foils 7 and 8 have flat metal coatings that are arranged so that after the LTCC ceramic films or foils 7 and 8 are placed on the tube 1, these metal surfaces form the measuring electrodes 2 and 3 and the screening or shielding electrodes 4 and 5. Here, parts of the measuring electrodes 2 and 3 and parts of the screening electrodes 4 and 5 are arranged, on one hand, between the LTCC ceramic films or foils 7 and 8, hence on their borders, and, on the other hand, on the outside of the outer LTCC ceramic film or foil 8. Since the layer 6 is made of LTCC ceramic films or foils 7 and 8 lying one over the other, the parts of the measuring electrodes 2 and 3 and the screening or shielding electrodes 4 and 5 lying inside the layer 6 are at a fixed defined distance from the tube 1 in the layer 6. Now, in order to produce a conductive connection from the parts of the measuring electrodes 2 and 3 and the screening or shielding electrodes 4 and 5 arranged on the outer surface of the LTCC ceramic film or foil 8 to the parts of the measuring electrodes 2 and 3 and the screening or shielding electrodes 4 and 5 arranged inside-in the same way described above-there is throughplatings or contacts 9 for the measuring electrodes 2 and 3 in the outer LTCC ceramic film 8 at appropriate places, as well as throughplatings or contacts 10 for the screening or shielding electrodes 4 and 5.

Figure 3:
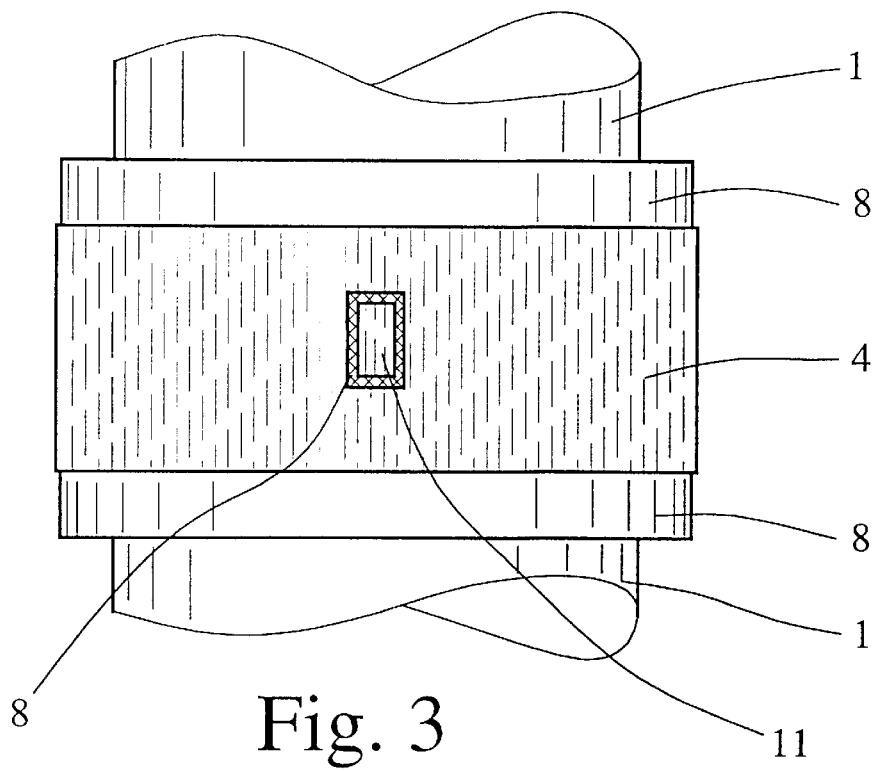
FIG. 3 is a top view of the tube of the FIG. 1 embodiment.

In the examples of embodiments of the magnetically inductive flow meter according to the invention shown in FIGS. 1 and 2, the measuring electrodes 2 and 3 are connected conductively to contact surfaces 11 and 12 with throughplatings or contacts 9 at which the voltage signals produced by the measuring electrodes 2 and 3 can be picked up. The contact surface 11 can also be seen in the top view of the magnetically inductive flow meter shown in FIG. 3. In this special embodiment, the contact surface 11 is rectangular. As can also be seen in FIG. 3, it is naturally necessary that the screening or shielding electrodes 4 are recessed in a region around the contact surface 11. In the other area, along the section including measuring electrodes 2 and 3 on the outside of the tube, the screening or shielding electrode 4 forms a continuous surface. Because of the symmetric arrangement of both the measuring electrodes 2 and 3 and the screening or shielding electrodes 4 and 5, the embodiment of the screening or shielding electrode 4 shown is also true for the screening or shielding electrode 5.

Figure 4:
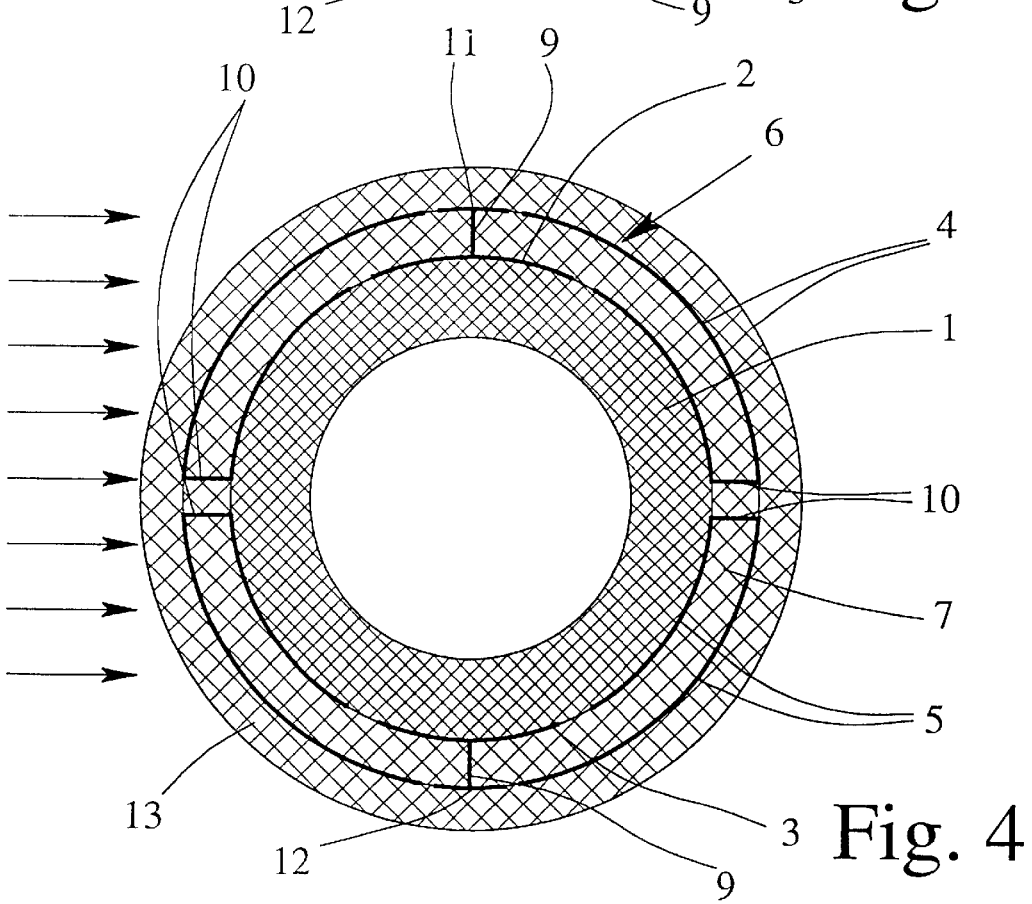
FIG. 4 is a cross section through the tube of a third embodiment of a flow meter according to the invention.
Figure 5:
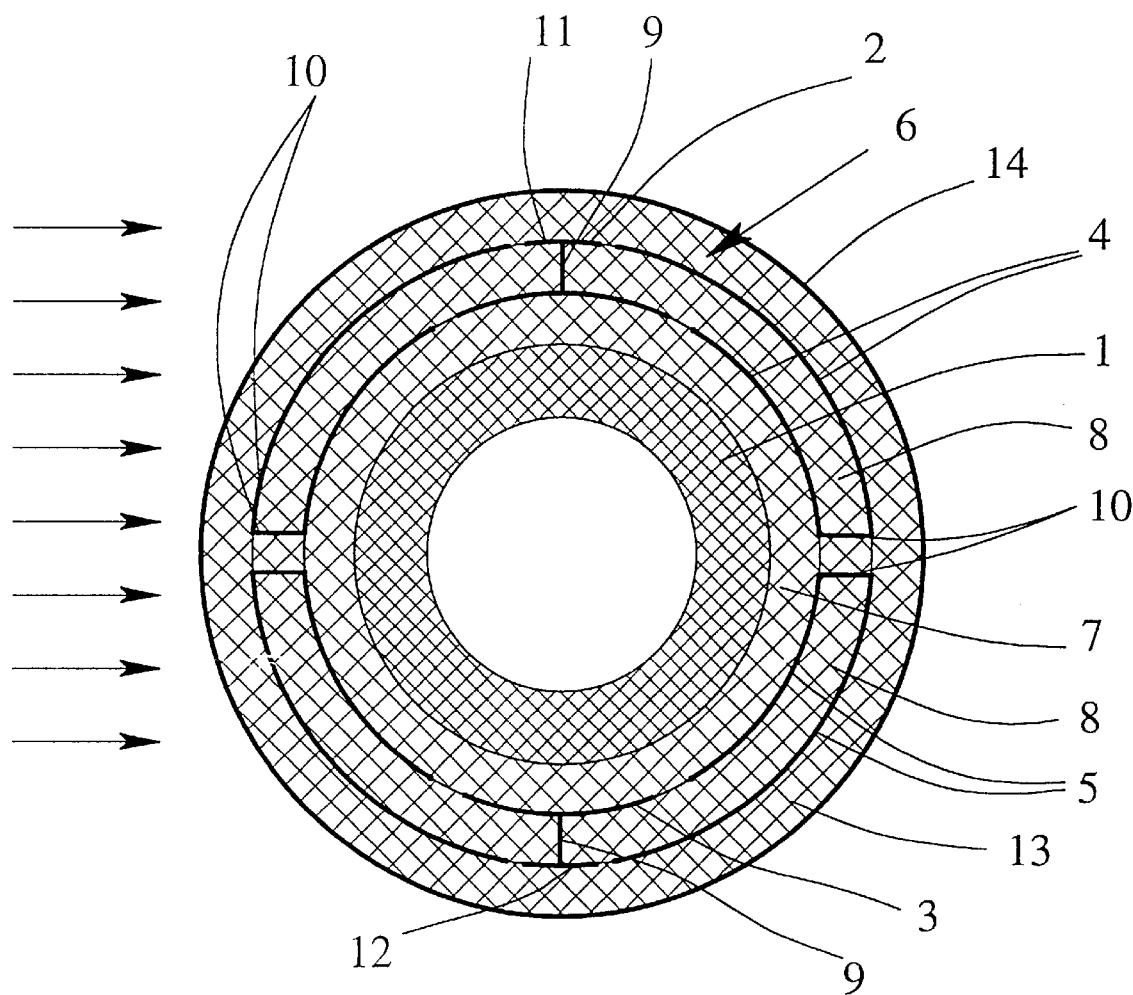
FIG. 5 shows a cross section through the tube of a fourth embodiment of a flow meter according to the invention.

The two flow meter embodiments shown in FIGS. 1 and 2 can also be surrounded, according to the invention, with another LTCC ceramic film or foil 13, as is the case in the third and fourth embodiments shown in FIGS. 4 and 5. This other LTCC ceramic film or foil 13 is mainly used for extra shielding. As shown in FIG. 5, the layer 6 in the fourth embodiment has another screening or shielding electrode 14, which preferably shields the screening or shielding electrodes 4 and 5 from the outside.

Finally, the shielding effect of the screening or shielding electrodes 4, 5 and 13 can be further enhanced, on one hand, by having the screening or shielding electrodes 4 and 5 guided electrically (bootstrap) with the measuring electrodes 2 and 3 electrically and, on the other hand, by having the screening or shielding electrode 14 connected to a fixed reference potential, preferably the earth, so that it is electrically conductive.

Since, as already described, the amplitude of the electrical signals that are available at the measuring electrodes 2 and 3, is very low, it is advantageous to amplify measuring signals with preamplifiers before further processing; here it is an advantage if the signal lines between the measuring electrodes 2 and 3 and their preamplifiers are kept as short as possible.

For this, another embodiment of the magnetically inductive flow meter in the invention is provided, to produce the conductor and resistor tracks needed to make the preamplifiers in the layer 6 with LTCC technology. For this, corresponding structures are formed on the LTCC ceramic films 7 and 8 before they are put on the tube 1 outside of the areas covered by the metal surfaces of the measuring electrodes 2 and 3 and the screening or shielding electrodes 4 and 5. For this, extra LTCC ceramic film or foil 13 is preferably used, when available.

In an especially advantageous way, a conductive connection from each measuring electrode 2 and 3 to its respective preamplifier is also produced in layer 6, preferably in the LTCC ceramic film or foil 13 with LTCC technology; preferably the shielding necessary for this conductive connection is made the same way. That way, after sintering, a complex structure is produced in the layer 6, which contains the arrangement of the measuring electrodes 2 and 3 and the screening electrodes 4 and 5, and also the signal line and the conductor and resistor tracks necessary for the design of the preamplifier. Then the electronic components need only be arranged directly on the layer 6 to receive preamplified measuring signals from the two measuring electrodes 2 and 3.

In other words, a large part of the measurement system is built into the tube 1 along with the layer 6, whereby the ceramic layer 6 is used as a "carrier plate" for the electronic components of the preamplifier.

In all the embodiments shown in FIGS. 1, 2, 4 and 5, it is true that the LTCC ceramic films or foils 7, 8 and 13 are shown extra thick in order to clarify the arrangement of the metal surfaces.

What is claimed is:

1. A magnetically inductive flow meter for flowing media of the type including a tube (1) made of ceramic material used as a measuring line, a magnet to produce a magnetic field extending perpendicular to the axis of the tube, at least two measuring electrodes (2, 3) arranged perpendicular to the tube axis and perpendicular to the direction of the magnetic field and, at least one shielding electrode (4, 5) shielding the measuring electrodes (2, 3) from outside electrical fields and a layer (6) of ceramic material surrounding the tube (1), wherein the measuring electrodes (2, 3) and said at least one shielding electrode (4, 5) are placed outside the tube and the measuring electrodes (2, 3) are arranged inside the layer (6) or on the border between the layer (6) and the tube (1) and wherein at least one flexible LTCC ceramic film or foil (7, 8), each having a surface and sinterable at low temperature, forms the layer (6) and the measuring electrodes (2,) and said at least one shielding electrodes (4, 5) is arranged on the surface of, or within said at least one LTCC ceramic film or foil (7, 8).

2. The flow meter according to claim 1, wherein parts of the measuring electrodes (2, 3) and part of said at least one shielding electrode (4, 5) is arranged, on the border between the LTCC ceramic film or foil (7) and the tube (1) and/or on the outside of said at least one LTCC ceramic film or foil (7), whereby there are throughplatings or contacts (9, 10) running through said at least one LTCC ceramic film or foil (7).

3. The flow meter according to claim 1 with at least outer and inner LTCC ceramic films or foils (7, 8) wherein on the border between the outer and inner LTCC ceramic films or foils (7, 8) and/or on the outside of the outer LTCC ceramic film or foil (8), parts of the measuring electrodes (2, 3) and parts of the said at least one shielding electrode (4, 5) are arranged, whereby there are throughplatings or contacts (9, 10) running through the outer LTCC ceramic film or foil (8).

4. The flow meter according to claim 1 wherein the measuring electrodes (2, 3) are each designed to have a contact surface (11, 12) on the outer surface of the layer (6).

5. The flow meter according to claim 1 wherein the measuring electrodes each has a contact surface and said at least one shielding electrode (4, 5) forms a continuous surface, except in an area around a said contact surface (11, 12).

6. The flow meter according to any one of claims 1 to 5 wherein the layer (6) has a further LTCC ceramic film or foil (13) arranged on the outside.

7. The flow meter according to claim 6 wherein the further LTCC ceramic film (13) has another shielding electrode (14) and said another shielding electrode (14) surrounds said at least one shielding electrode (4, 5).

8. The flow meter according to claim 7 wherein said at least one shielding electrode (4, 5) is guided electrically with the measuring electrode (2, 3) and said another shielding electrode (14) is connected to a fixed reference potential and is preferably grounded.

9. The flow meter according to any one of claims 1 to 5 wherein for each measuring electrode (2, 3), there is a preamplifier and conductor and resistor tracks necessary for building the preamplifier in the further LTCC ceramic film or foil (13) which preamplifier, conductor and resistor tracks are produced with LTCC technology.

10. The flow meter according to claim 6 wherein a conductive connector extends from each measuring electrode (2, 3) and preferably the shielding necessary for that conductive connector, is produced in the further LTCC ceramic film or foil (13) with LTCC technology.

* * * * *